United States Patent [19]

Yamashita

[11] 3,749,257

[45] July 31, 1973

[54] UNLOADING MACHINE

[75] Inventor: Umeo Yamashita, Osaka, Japan

[73] Assignee: Yamashita Iron Works Ltd., Osaka, Japan

[22] Filed: July 8, 1971

[21] Appl. No.: 160,710

[30] Foreign Application Priority Data
Nov. 19, 1970 Great Britain.................. 55,084/70

[52] U.S. Cl............................................. 214/8.5 A
[51] Int. Cl............................................. B65g 59/02
[58] Field of Search...................... 214/8.5 A, 8.5 R; 198/165

[56] References Cited
UNITED STATES PATENTS

| | | | |
|---|---|---|---|
| 3,263,829 | 8/1966 | Verrinder | 214/8.5 A |
| 3,070,241 | 12/1962 | Johnston | 214/8.5 A |
| 2,890,787 | 6/1959 | Carter | 198/34 A |
| 3,004,650 | 10/1961 | Pettee | 198/34 A |

Primary Examiner—Gerald M. Forlenza
Assistant Examiner—George F. Abraham
Attorney—Bruns & Jenney

[57] ABSTRACT

This machine unloads articles piled up in layers on a pallet successively from the uppermost layer. The machine includes a movable conveyor adapted for horizontal reciprocal movement between a predetermined front position and a rear position to send out the articles rearward and an elevator for supporting articles on the pallet in the path of movement of the conveyor. The movable conveyor is provided, at its front end with a lower endless belt for scooping up the articles in frictional contact therewith and an upper endless belt disposed above the lower endless belt for preventing the articles from tumbling during scooping-up operation. These belts are driven in the direction to send out the articles rearward by a motor fixedly mounted on part of a support structure by way of chain-sprocket transmission mechanism. The upper and lower endless belts are adapted to be driven at a higher velocity when the movable conveyor is moved forward than when it is retracted.

2 Claims, 9 Drawing Figures

UNLOADING MACHINE

BACKGROUND OF THE INVENTION

The present invention relates to an unloading machine, more particularly to an apparatus for unloading articles piled up on a pallet in layers from the uppermost layer one row after another and sending out the articles in a row.

An unloading machine has heretofore been known which includes a movable conveyor adapted to be moved back and forth on a plane and provided with frictional rollers at its front end and elevator for supporting articles on a pallet in the path of movement of the conveyor so as to scoop up the articles by the frictional rollers, deliver them onto the movable conveyor and send them out backward. However, when the articles are lifted up by the frictional rollers, the articles are frequently tumbled forward since they are brought to inclined position by the advancing rollers, with the result they are broken or scattered about. The occurrence of such accident consequently interrupts unloading operation to lower the work efficiency.

SUMMARY OF THE INVENTION

The present invention provides an apparatus which is capable of unloading articles from pallets without tumbling the articles. In connection with such apparatus, this invention provides a mechanism of the novel type for scooping up articles and a drive mechanism therefor. The article scooping-up mechanism mounted on the front end of a movable conveyor for transporting the articles backward includes a frictional rotary body for lifting the articles in frictional contact therewith and means for preventing articles from tumbling disposed above the rotary body and adapted to hold inclined articles from above. While the articles are scooped up by the rotary body in inclined position, the tumbling prevention means effectively prevents the articles from tumbling down forwardly when the articles are pushed forward on the under faces by the advancing frictional rotary body, thereby assuring safe unloading operation. The tumbling prevention means comprises an upper endless belt disposed substantially in parallel with a lower endless belt for scooping up articles in facing relation thereto and spaced apart therefrom by a distance for permitting the articles to pass through. Both upper and lower endless belts are driven in directions opposite to each other so as to scoop up the articles and send out the same backward. This assures that when the upper end of an article is brought into contact with the upper endless belt, the upper and lower endless belts cooperate to positively send out the article toward the movable conveyor for smooth, trouble-free and prompt unloading operation. The upper and lower endless belts and rollers of the movable conveyor are driven by a motor fixed to a support structure by means of a chain-sprocket transmission mechanism. The provision of the motor on the support structures ensures the advantage that it can be mounted in place in simpler manner than is the case where it is mounted on the movable conveyor and that the movable conveyor can be driven back and forth with a lower driving force. The present invention will be described in greater detail with reference to the accompanying drawings.

DESCRIPTION OF THE PREFERRED EMBODIMENTS

Figure 1:
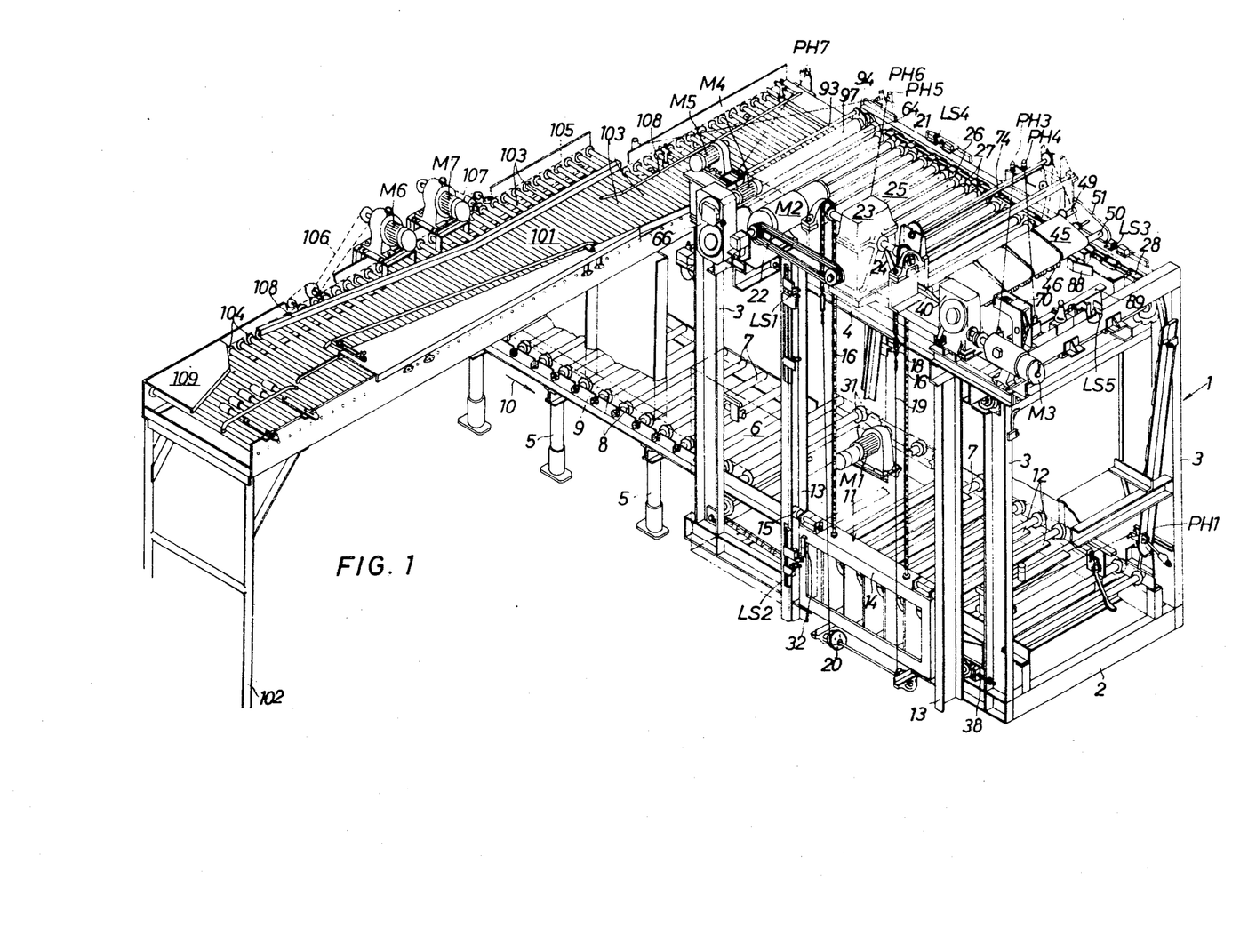
FIG. 1 is a perspective view showing an unloading machine of this invention with part broken away.

An embodiment of the unloading machine of this invention shown in FIG. 1 is provided with a support structure 1 made of shape steel comprising a base frame 2 and a suitable number of vertical posts 3 spaced apart from each other and an upper support frame 4 disposed thereon. One end of a pallet feed conveyor 6 supported on legs 5 extends into the lower portion of a support structure 1 and a number of rollers 7 are interconnected in mutual driving relation by sprocket 8 fixed to the ends of the rollers and chains 9 reeved around the sprockets 8. One of the rollers 7 disposed intermediately of a row of the rollers 7 is operatively connected to a motor $M_1$ through a sprocket and chain drive mechanism 31. When a pallet P loaded with articles A is placed in position, the rollers 7 are driven by the motor $M_1$ so as to send the pallet P in the direction indicated by a reference arrow 10. The pallet is therefore advanced to a position where it is transferred onto an elevator 11 in the machine. Disposed at the front end of a pallet feed conveyor 6 is a photoelectric tube switch $PH_1$ for giving an instruction to stop the conveyor 6 and instruction to raise the elevator 11, the arrangement being such that when the pallet P loaded with articles A is sent to a predetermined position on the elevator 11, the front end of the pallet intercepts a beam from the photoelectric tube switch $PH_1$.

Figure 2:
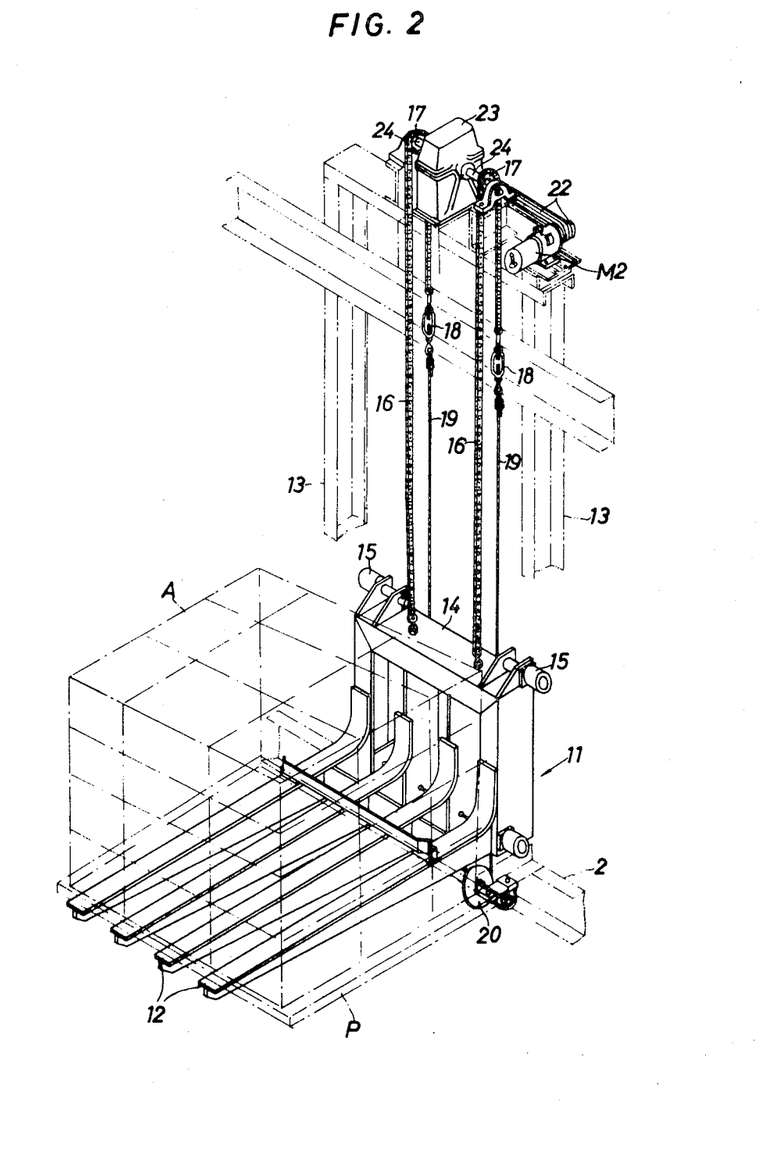
FIG. 2 is a perspective view showing an elevator mechanism provided for the unloading machine of FIG. 1, the view being a rear view of FIG. 1.

As shown in greater detail in FIG. 2, the elevator 11 includes a plurality of support arms 12 each adapted to be positioned between adjacent rollers 7, 7 of the pallet feed conveyor 6 when the elevator 11 is located at the lowermost position. Each of the support arms 12 is secured, at its one end, to a movable frame 14 which is adapted to be moved up and down along two vertical guide bars 13 constituting part of the support structure 1 of the machine. Guide rollers 15 mounted externally on the upper and lower ends of the movable frame 14 are fitted into the groves of the guide bars 13 in vertically movable manner. Two chains 16 for lifting the elevator 11 are passed around sprockets 17 disposed above the upper support frame 4, one end of each chain being secured to the upper end of the movable frame 14 of the elevator 11, the other end thereof being connected to a wire 19 by means of a metal connecter 18 whose length is adjustable. The other end of the wire 19 is passed over a wire sheave 20 rotatably supported on the outside of the base frame 2 and secured to the lower end of the movable frame 14 of the elevator 11. Thus, the chain 16 and wire 19 are connected together in endless form through the movable frame 14. A motor $M_2$ for driving the elevator 11 is mounted on the upper support frame 4 and drives a shaft 24 of the sprockets 17 through a pair of pulleys, belt 22 and a reduction gear 23. A limit switch $LS_1$ for giving instructions to elevate and stop the elevator 11 and a limit switch $LS_2$ for initiating the operation of the pallet feed conveyor 6 are provided at the upper and lower ends of the guide bar 13 respectively and adapted to be brought into contact with an actuating member 32 when the elevator 11 reaches the upper limit and lower limit of its movement (see FIG. 1).

Figure 3:
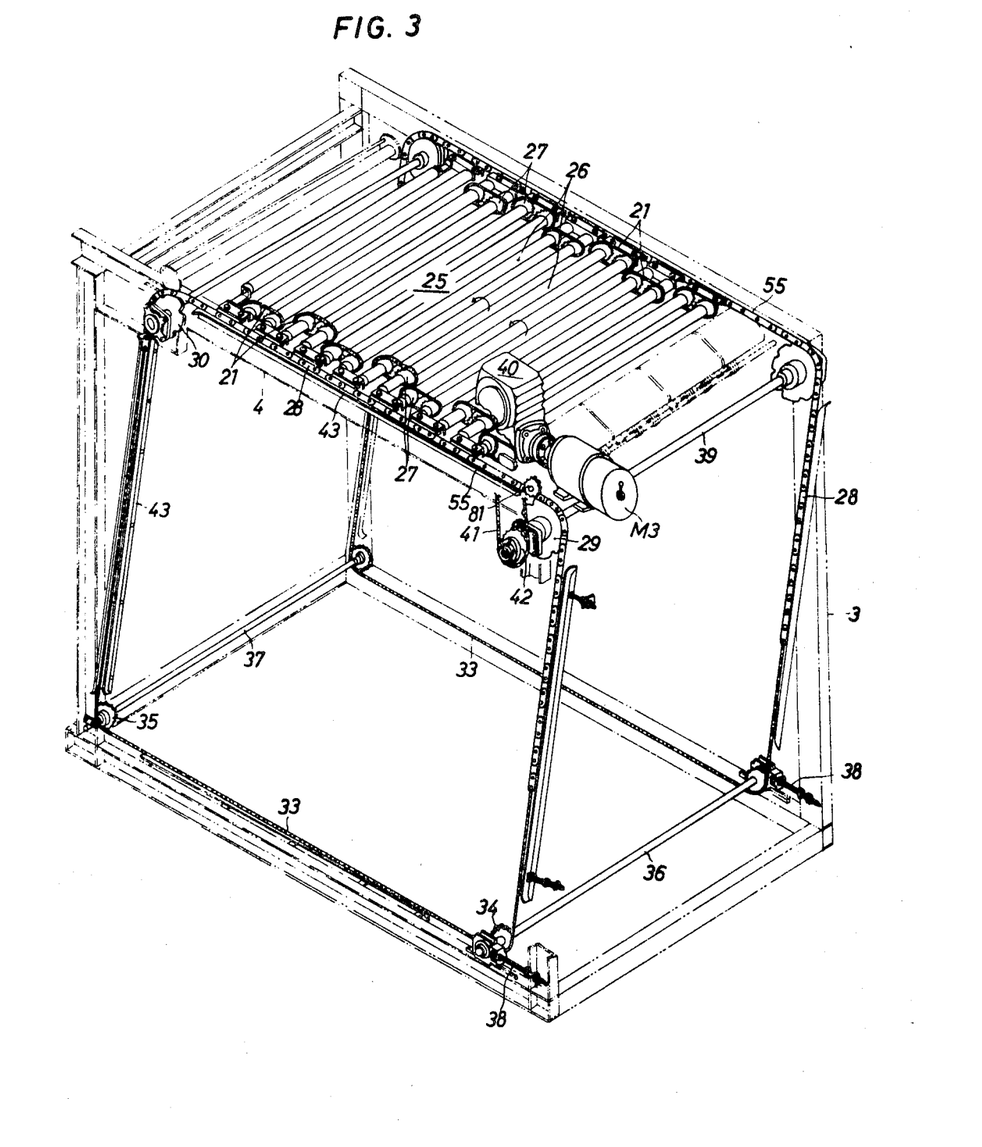
FIG. 3 is a perspective view showing only a movable conveyor mechanism in the machine shown in FIG. 1.

As indicated at A in FIG. 2, the articles on the pallet P are arranged in ranks each including several articles and piled up in multi-layers. FIG. 3 shows in detail a flexible movable conveyor 25 for removing the article A from the pallet P one row after another. Referring to the figure, the movable conveyor 25 includes a number of rollers 26 having a predetermined length and aranged in parallel. These rolles 26 are operatively interconnected so as to be rotated in the same direction by means of sprockets 27 mounted on the opposite ends thereof and chains 21 trained over the sprockets, each of the roller 26 further being secured at its opposite ends to the links of a pair of roller chains 28 spaced apart in parallel by a predetermined distance. The roller chains 28 serve to move the movable conveyor 25 toward or away from articles A which have been brought to a predetermined position by the elevator 11. Each of the roller chains 28 is trained, in inverted U-shape, over a pair of sprockets 29 and 30 which are mounted on the upper support frame 4 respectively at its front and rear ends. Two other chains 33 smaller than the roller chains 28 are respectively reeved in U-form around pairs of sprockets 34 and 35 disposed at the front and rear of the support structure 1 at its lower portion, the opposite ends of the chains 33 being connected to the opposite ends of the roller chains 28 respectively. Thus, both chains are disposed in endless manner approximately in square form. Two rotary shafts 36 and 37 carrying the sprockets 34 and 35 are mounted on the base frame 2 and one of the shafts is adapted to be moved forward and backward in horizontal direction by tension means 38.

A reversible motor $M_3$ for driving the movable conveyor 25 toward or away from the articles A lifted to the predetermined position by the elevator 11 rotates a drive shaft 39 to which the sprockets 29 are keyed by way of a reduction gear 40, chain 41 and sprocket 42. Guide plates 43 for the roller chains 28 and chains 33 are disposed at suitable positions along linear portions of the chains.

Means for scooping up the articles from the pallet P in frictional contact therewith is mounted at the front end of the movable conveyor 25, namely at the end of the conveyor to be brought into proximity with the articles A. The construction of the scooping means is illustreated in detail in FIGS. 4 to 6. Referring to these drawings, the scooping means 44 includes a plurality of upper endless belts 45 and lower endless belts 46 which are spaced apart by a distance slightly greater than the height of the article A. The upper belts 45 serve to prevent tumbling of the article A and are in the form of flat belt. The belts 45 are passed around pulleys 47 and 48 in inclined position. The pulleys 47 and 48 are mounted on shafts 49 and 50 supported on opposite brackets 51 and 51 adapted for upward and downward movement. A drive sprocket 52 is keyed to the shaft 49 at its end. A screw rod 53 for adjusting the level of the bracket 51 is screwed vertically into a screw cylinder 51a at its base portion and the upper and lower ends of the screw rod 53 are rotatably supported by a support frame 54, the arrangement being such that by turning the rod with a spanner or the like, the bracket 51 can be moved up or down. The support frame 54 is provided at each side of the machine, and the lower end of the frame 54 is secured by suitable means to the inner side of an elongated link 55 which is longer than the other links included in the roller chain 28. The lower belts 46 which scoop up the articles A in frictional contact with one side face thereof are in the form of a plurality of V-belts. Several sets of the V-belts, each comprising three belts, are reeved around pulleys 56 and 57 and spaced apart by a predetermined distance along the direction of the width at the forward end of the movable conveyor 25. The belts 36 are positioned slightly rearwardly of the upper belts 45 with their upper faces disposed at a smaller inclination than the under faces of the upper belts 45. Shafts 58 and 59 carrying the pulleys 56 and 57 respectively keyed thereto are rotatably supported at their opposite ends on plates 60 disposed inside the support frames 54 at their lower ends, the shaft 58 being provided at its one end with a sprocket 61 for driving the lower endless belts and, at the other end, with a sprocket 62 for driving rollers of the movable conveyor 25 (see FIG. 6).

Figure 6:
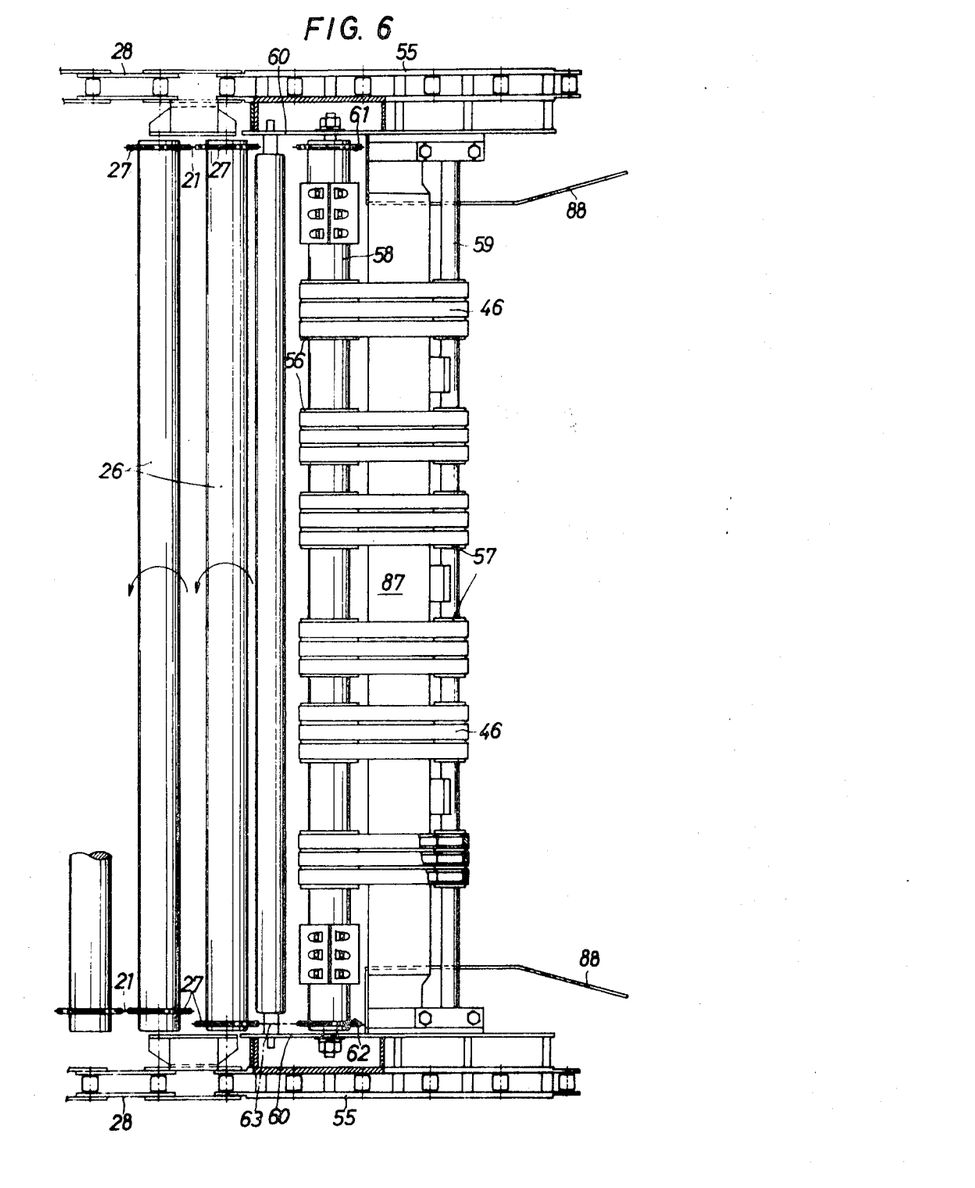
FIG. 6 is a view showing the means in FIG. 5, part of the view being in section taken along the line 6—6.

The sprocket 62 is operatively associated through a chain 63 with the sprocket 27 of one roller 26 at the forward end of the movable conveyor 25 so as to drive the roller.

Figure 4:
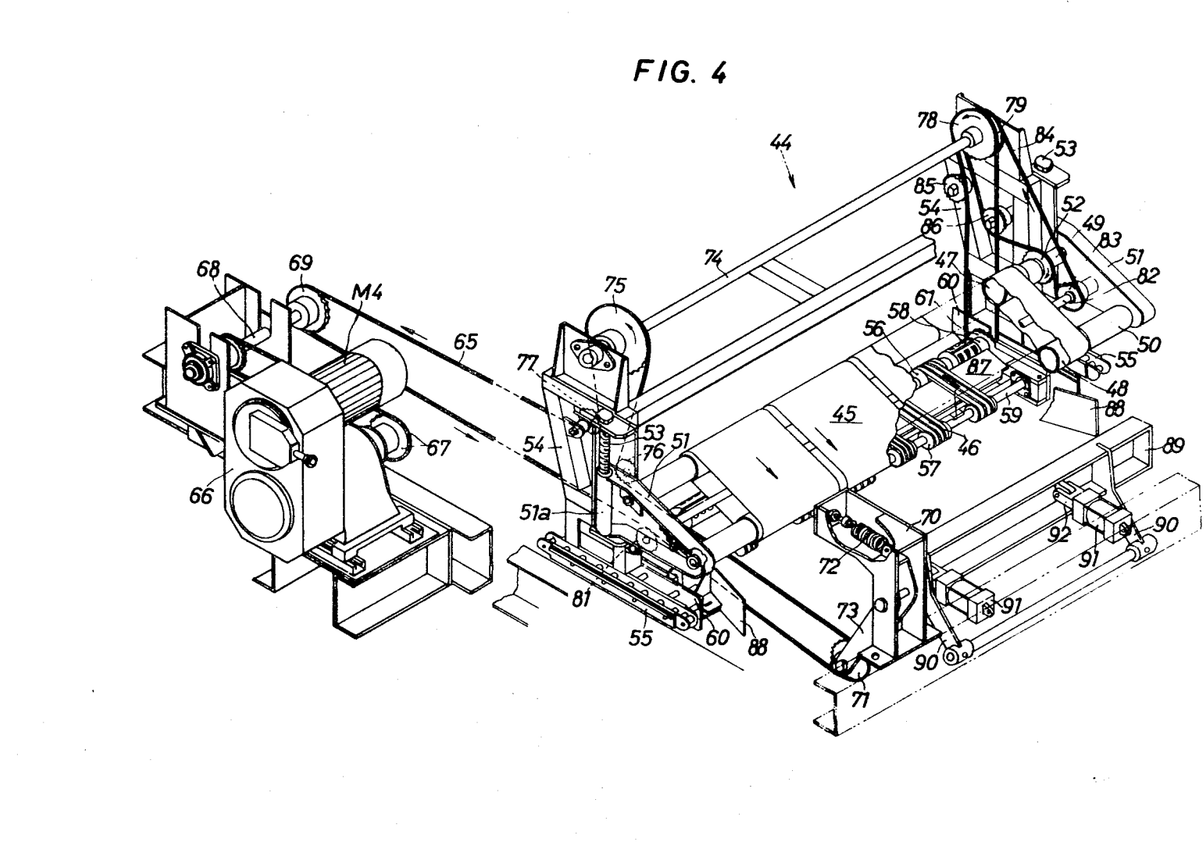
FIG. 4 is a perspective view showing article scooping means to be mounted on the front end of the movable conveyor of FIG. 3 and a drive mechanism therefore with part broken away.
Figure 5:
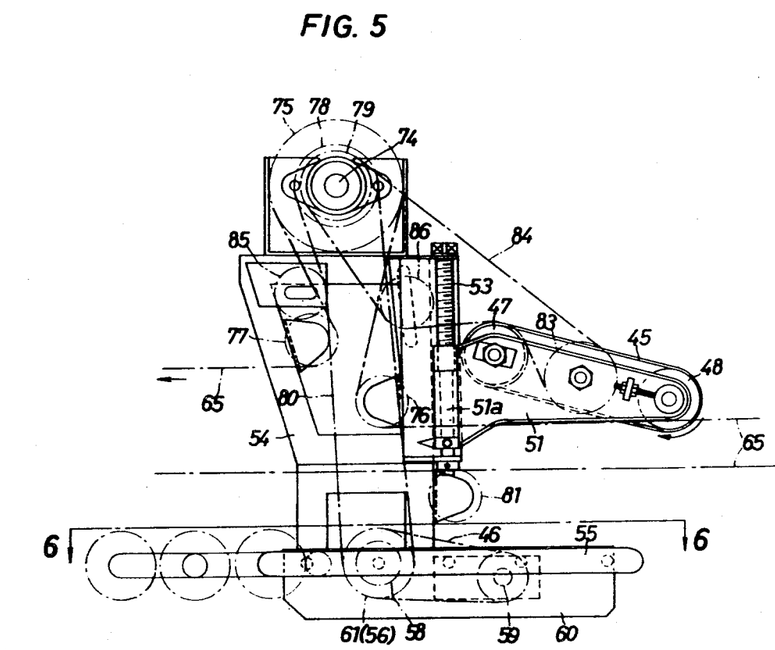
FIG. 5 is a side elevation showing the article scooping means in FIG. 4.

The upper belts 45 and lower belts 46 included in the scooping means 44 are driven by a chain 65 in such direction as to transfer the articles onto the movable conveyor 25 in the rear, the chain 65 being adapted to be driven by a motor $M_4$ always in one direction. The motor $M_4$ is fixedly mounted on the upper support frame 4 on one side close to its rear end and drives a rotary shaft 68 through a reduction gear 66 and sprocket-chain transmission means 67. The chain 65 is trained around a sprocket 69 fixed to one end of the rotary shaft 68 and a sprocket 71 of tension means 70. The sprocket 71 is mounted on a distal end of a pivotal arm 73 one end of which is pulled by a spring 72 so as to keep the chain 65 taut. A sprocket 75 is keyed to one end of a shaft 74 transversely and rotatably supported on the upper ends of the opposite support frame 54 and 54. The upper run of the chain 65 is reeved around idle sprockets 76 and 77 disposed at a lower opposite side portions of the frame 54, with the intermediate portion of the chain 65 trained over the sprocket 75 in an inverted U-form. The sprocket 75 is driven in a counter-clockwise direction. Rotatably supported on the bracket 51 on its inner side is an idle sprocket 81 on which an intermediate portion of the lower run of the chain 65 is supported. Two sprockets 78 and 79 are keyed to the shaft 74 at the other end thereof, one of the sprockets being operatively connected by a chain 80 to the aforementioned sprocket 61 for driving the lower belts, the other sprocket being associated through a chain 84 with an idle sprocket 83 mounted on one end of a shaft 82 supported on the brackets 51 and 51. Part of the lower run of the chain 84 is passed over the sprocket 52 for driving the upper belts 45, these sprockets thus being retained in operative relationship with each other. Supported on the inner face of the support frame 54 are two idle sprockets 85 and 86 which are associated with the chains 80 and 84 respectively so as to guide the chains. A belt guiding plate 87 is disposed transversely of the machine between the upper run and the lower run of the lower belt 46 and the oppposite ends of the guiding plate 87 are secured to the lower ends of the opposite support frames 54. Guide plates 88 on the opposite sides serving as guide during depalletizing operation are disposed to the front of the lower forward ends of the support frames 54 and project forwardly and outwardly in flaring fashion. A stop plate 89 for preventing the articles A from moving forwardly of and away from the scooping means 44 during unloading operation is positioned ahead of the means 44. The stop plate 89 is supported at its opposite ends on the upper ends of pivot arms 90. Piston rods 92 of air cylinders 91 are pivotally connected, at their distal ends, to the stop plate 89 on its face opposite to the face to be brought into contact with the articles A. During the operation, air is supplied to the air cylinders all the time to retain the piston rods 92 in extended position.

Figure 7:
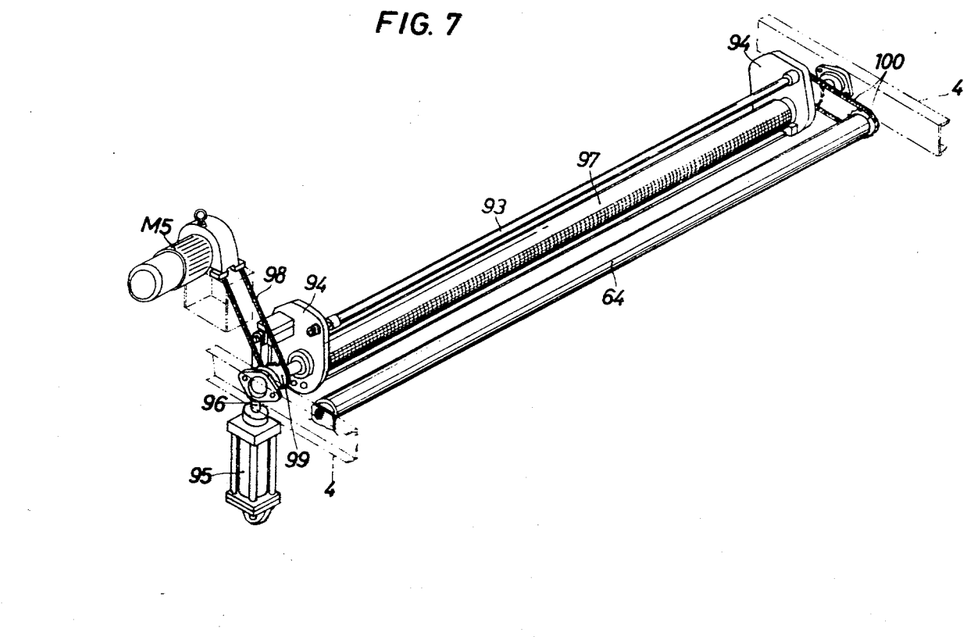
FIG. 7 is a perspective view showing a stopper and a transfer assembly mounted at the rear end of the movable conveyor in FIG. 3.

A stopper 93 shown in FIG. 7 is positioned slightly rearwardly of the downwardly bent rear portion of the movable conveyor 25. At this position, the articles A are transferred from the movable conveyor 25 to a delivery conveyor 101 shown in FIG. 1. The stopper 93 is in the form of a slender roller rotatably supported at its ends on opposite pivotal plates 94. During operation, the stopper 93 is positioned above the article carrying plane of the movable conveyor 25, whereas when the articles are transferred on to the delivery conveyor 101, it is retracted downward to open the passage. An air cylinder 95 is provided with a piston rod 96 whose distal end is connected to a portion of one of the pivotal plate 94, the stopper 93 thereby being adpated for upward and downward movements described above.

An article delivery roller 97 provided with a rubber lining is transversely positioned between the opposite pivotal plates 94 and supported by the plates at the center of the pivotal movement. The roller 97 is driven in the direction of transport of the articles by a motor $M_5$ through a chain 98 and a sprocket 99. Another delivery roller 64, positioned ahead of the roller 97, is operatively associated therewith through a chain and sprocket mechanism 100.

Referring to FIG. 1, the delivery conveyor 101 is positioned to the rear of and at a right angle with the movable conveyor 25 and supported at its opposite ends by a plurality of legs 102. A great number of rollers 103 providing a delivery path are operatively connected together by a sprocket 104 mounted at one end of each roller and a chain trained around each group of sprockets 104 which group comprises a plurality of the sprockets. Through chain and sprocket transmission means 106 and 107, the torque of two motors $M_6$ and $M_7$ is delivered to two suitable rollers among the rollers 103. Thus all of the rollers 103 are driven at the same time in operative relationship. Provided on the delivery conveyor 101 are a plurality of guide members 108 for forming a path for transporting the articles A in a single row. Further mounted at the rear end of the conveyor 101 on one side thereof is a guide plate 109 for bringing the articles to a position longitudinally parallel to the direction of transport which articles have been sent forward with their lengthes positioned parallel or transverse to the direction of travel.

Limit switches $LS_3$ and $LS_4$ are disposed at the positions of forward and backward ends of movement of the conveyor 25, on the upper face of the upper support frame 4 at its one side. When the conveyor 25 reaches the terminal position of its forward travel, the switch $LS_3$ is actuated upon contact with an actuating member provided at the front end of the movable conveyor 25 and de-energizes the motor $M_3$ to stop the forward movement of the movable conveyor 25, while actuating the air cylinder 95 to lower the stopper 93. The other limit switch $LS_4$ is actuated when the movable conveyor 25 reaches the terminal position of its backward movement, the limit switch $LS_4$ thus providing an electrical instruction for halting the backward movement of the movable conveyor 25. The limit switch $LS_4$ also energizes the motor $M_2$ and provides an instruction to move up the elevator 11. A limit switch $LS_5$ is positioned slightly ahead of a stop plate 89 for preventing forward movement of the articles A. If the articles are not smoothly scooped up due to an accident and the stop plate 89 is forced to move against the pneumatic pressure of the air cylinders 91, the stop plate 89 comes into contact with the limit switch $LS_5$ to stop the movement of the conveyor 25 completely.

Photoelectric tube switches $PH_3$ and $PH_4$ each comprising a projector and receiver are so disposed as to project upwardly from the upper support frame 4, the positions of the switches $PH_3$ and $PH_4$ being such that when the elevator 11 moves up the uppermost layer of the articles A about 9/10 the height of the articles above the level of the forward ends of the lower belts 46 for scooping, the beams will be intercepted by the articles. When the beams from the switches $PH_3$ and $PH_4$ are thus intercepted, the electrical instructions thereby produced act to halt the elevation of the elevator 11 while initiating the movable conveyor 25 into forward movement. Another photo-electric tube switch $PH_5$ is mounted on the upper support frame 4 at a position close to its rear end, and when the articles A are present on the movable conveyor 25 the beam from the switch $PH_5$ is intercepted. When the beam becomes no longer intercepted, the switch $PH_5$ gives an instruction to the conveyor 25 for retraction. Other two photoelectric tube switches $PH_6$ and $PH_7$ provide instructions to actuate the air cylinder 95 so as to initiate the stopper 93 into upward and downward movements. The switches $PH_6$ and $PH_7$ are mounted on a frame at the front and of the delivery conveyor 101 and so positioned that the beam thereof will be intercepted by the articles when they are present on the delivery conveyor 25 at a position just behind the movable conveyor 25.

Now a complete cycle of the operation for removing articles from a pallet will be explained below.

Figure 8:
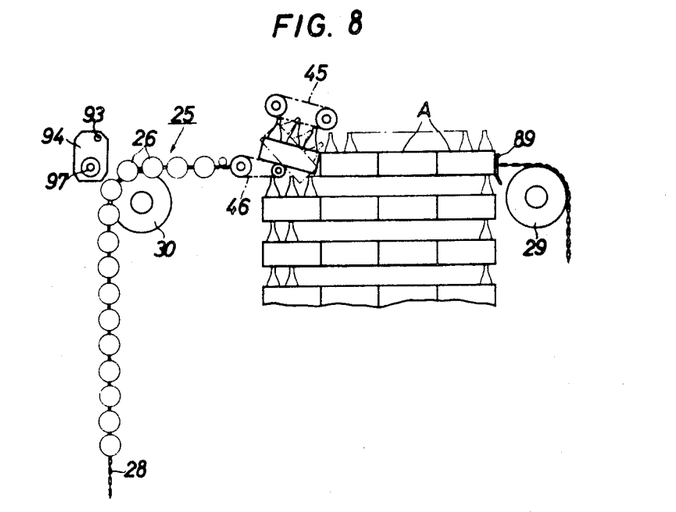
FIG. 8 and 9 are views schematically showing one step of the unloading operation.
Figure 9:
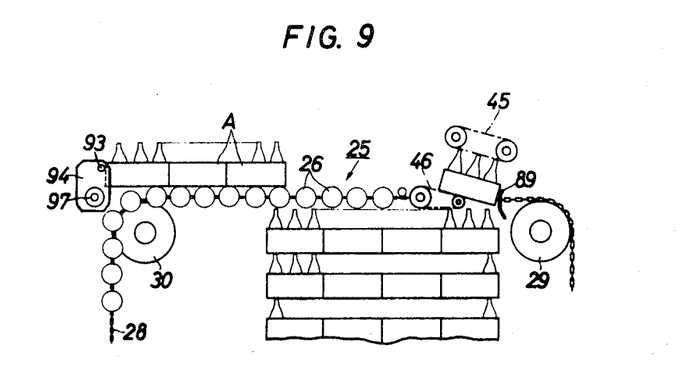

The pallet P loaded with articles A in layers is carried by the feed conveyor 6 onto the elevator 11 in the interior of the support structure 1. When the front end of the load intercepts the beam from the photoelectric tube switch $PH_1$, the motor $M_1$ is thereby halted to stop the movement of rollers of the feed conveyor 6. At the same time, the motor $M_2$ for driving the elevator 11 is initiated into rotation in a positive direction to raise the elevator 11. At this time, the movable conveyor 25 is in a retracted position and the upper portion of the support structure 1 is left open. Accordingly, the uppermost layer of the articles A, when brought up to a predetermined level above the upper support frame 4, intercepts the beams from the photoelectric tube switches $PH_3$ and $PH_4$, whereby the upward movement of the elevator 11 is stopped. At the same time, the motor $M_3$ for driving the movable conveyor 25 is energized for rotation in a positive direction, causing the roller chains 28 to run rightward as seen in FIG. 3 to advance the conveyor 25 toward the articles A. During this time, the upper belts 45, lower belts 46 and rollers 26 are driven in the directions indicated by arrows in the figure due to the rotation of the motor $M_4$ and the resultant operation of the chain 65. When the front ends of the lower belts 46 are brought into contact with the first row of the articles A in the uppermost layer, the belts 46 as shown in FIG. 8 raise the articles in frictional contact therewith due to the rotation of the belts and carry up the articles A on the upper surfaces thereof as they move forward. During this operation, the articles A are prevented from moving away from the scoop means 44 since the last row of the articles in the layer to be removed is in abutting contact with the stop plate 89, the scooping operation by the lower belts 46 thus being insured. If the belts 46 fail to scoop up the articles A for one reason or another, the stop plate 89 will be pushed forward against the neumatic pressure within the air cylinders 91, with the results that the stop plate comes into contact with the limit switch $LS_5$ to stop all of the movements of the conveyor 25. The rows of articles A which have been depalletized one row after another as the lower belts 46 advance are carried rearward by the rollers 26 in rotation. During this operation, the upper belts 45 act in the following manner to prevent the articles A from tumbling. Suppose articles A, for instance, bottled-packed boxes are carried upward in an inclined position on the lower endless belts 46. If the front end of a box falls between the bottles in the underlying layers, the box will be tumbled as the lower belts 46 advance. However, the upper belts 45 disposed above and slightly ahead of the lower belts 46 engage the upper end of the inclined articles A and drive the article A backward, so that the article can be transferred onto the movable conveyor 25. When the articles are scooped up in normal position, the upper ends of the bottles, namely the upper ends of the articles A pass slightly below the upper belts 45 without coming into contact therewith.

When the articles A are transferred onto the movable conveyor 25, the stopper 93 in the rear is positioned above the conveyor plane of the group of rollers 26. The articles A sent rearward on the conveyor 25 are blocked by the stopper 93 one after another and retained on the conveyor 25. When the articles A in one layer have all been depalletized and the conveyor 25 reaches the terminal position of its forward travel 25, the limit switch $LS_3$ is actuated, whereby the motor $M_3$ is stopped, the piston rod 96 of the air cylinder 95 being retracted simultaneously therewith to cause the pivotal plates 94 to move backward pivotally. Thus the stopper 93 is withdrawn downward from the plane of the rollers 26. As a result, the articles A are transferred onto the delivery conveyor 101 one row after another from the foremost position. Since the transfer rollers 97 and 64 are driven at a higher velocity than the rollers 26 of the movable conveyor 25, the article A sent out onto the delivery conveyor 101 will be spaced apart from the following article A, with the result that when a row of articles A is transferred onto the delivery conveyor 101 to intercept the beams from the photoelectric switches $PH_6$ and $PH_7$, the instructions produced by the switch cause the stopper 93 to elevate again. While the following rows of articles A are blocked by the stopper, the first row of the articles A is carried in the direction of delivery by the conveyor 101. When the beams from the photoelectric tube switches $PH_6$ and $PH_7$ become no longer intercepted, the stopper 93 is lowered again, whereupon the second row of the articles A is sent out onto the delivery conveyor 101 in like manner.

Thus, when all the articles A on the movable conveyor 25 have been sent out, interception of the beam from the photoelectric switch $PH_5$ is relived, whereupon the motor $M_3$ is rotated in a direction opposite to the previous direction to retract the movable conveyor 25. In this operation, the rollers 26 and upper and lower belts 45, 46 are slowed down due to the relationship with the running direction of the chain 65 and are therefore driven at a low velocity. As a result noises are minimized. The limit switch $LS_4$, actuated when the movable conveyor 25 reaches the extreme position of its backward travel, stops the motor $M_3$ to halt the retraction of the movable conveyor 25 and at the same time initiates the motor $M_2$ into operation to lift the elevator 11. After the articles A in the uppermost layer intercept the photoelectric switches $PH_3$ and $PH_4$, the subsequent operations of the machine will be carried out in the same manner as described above.

Thus the articles A in the upper position are removed successively from the elevator 11 onto the movable conveyor 25. Upon the elevator 11 reaching the extreme end of its upward movement, the limit switch $LS_1$ is actuated, whereby the motor $M_2$ is momentarily stopped. The motor $M_2$ will then be rotated in the reverse direction to lower the elevator 11 until the elevator reaches the end of its downward travel, whereupon the limit switch $LS_2$ is actuated. The instruction given by the switch then brings the motor $M_2$ to a halt to stop the downward movement of the elevator 11. Simultaneously with this, the motor $M_1$ for the feed conveyor 6 is energized to bring the articles A on another pallet P onto the elevator 11.

As apparent from the description above, the present invention provides a novel and efficient machine by which the articles loaded on pallets are removed from the uppermost position one row after another without tumbling the articles.

I claim:

1. An unloading machine comprising a movable conveyor supported on a support structure and including a number of rollers adapted to be moved reciprocally between a front position and a rear position, article scooping means mounted at the front end of said conveyor, drive means for moving said conveyor toward and away from articles together with said scooping means and means for preventing said articles from moving away from said scooping means, said article scooping means being provided with a rotary body for lifting said articles in frictional contact therewith and means disposed above said rotary body for preventing said articles from tumbling, each of said rotary body for lifting said articles and said means for preventing said articles from tumbling comprising at least one endless belt, both of said belts being adapted to be driven in such directions as to send said articles toward the rear of said movable conveyor.

2. An article unloading machine comprising a support structure, a movable conveyor including a number of rollers reciprocally movable in horizontal direction on said support structure, means for supporting articles in the path of movement of said conveyor, a plurality of lower endless belts disposed side by side along the width of front end of said movable conveyor, at least one upper endless belt disposed above said lower endless belts in facing relationship therewith and spaced apart therefrom by a distance for passing said articles, conveyor drive means for reciprocating said movable conveyor along said path and bringing said lower endless belts into contact with said articles, a motor fixedly mounted on said support structure at its side portion, endless chains to be driven by said motor and trained over a distance longer than the length of path of said movable conveyor, means for driving said upper and lower endless belts and rollers of said movable conveyor in such directions as to scoop up said articles and send out the same backward when said chains are driven, and means for preventing said articles from moving away from said lower endless belts, said upper and lower endless belts and said rollers being adapted to be driven at a lower velocity when said movable conveyor is moved backward than when it is advanced.

* * * * *